United States Patent [19]

Conway et al.

[11] Patent Number: 5,049,353
[45] Date of Patent: Sep. 17, 1991

[54] PASSIVE CONTAINMENT COOLING SYSTEM

[75] Inventors: Lawrence E. Conway, Robinson Township, Allegheny County; William A. Stewart, Penn Hills Township, Allegheny County, both of Pa.

[73] Assignee: Westinghouse Electric Corp., Pittsburgh, Pa.

[21] Appl. No.: 341,442

[22] Filed: Apr. 21, 1989

[51] Int. Cl.$^5$ .............................................. G21C 13/00
[52] U.S. Cl. ................................... 376/293; 376/299; 376/305; 376/900
[58] Field of Search ............... 376/299, 298, 293, 294, 376/295, 283, 305, 900

[56] References Cited

U.S. PATENT DOCUMENTS

| | | |
|---|---|---|
| 3,168,445 | 2/1965 | Ziegler et al. .................. 376/283 |
| 3,207,671 | 9/1965 | Kornbichler . |
| 3,666,616 | 5/1972 | Schluderberg . |
| 3,929,567 | 12/1975 | Schabert et al. . |
| 4,753,771 | 6/1988 | Conway et al. . |

FOREIGN PATENT DOCUMENTS

| | | |
|---|---|---|
| 568894 | 12/1960 | Belgium . |
| 0026705 | 4/1981 | European Pat. Off. . |
| 0029372 | 5/1981 | European Pat. Off. . |
| 1564546 | 11/1969 | Fed. Rep. of Germany . |
| 2506063 | 11/1982 | France . |
| 31092 | 2/1985 | Japan ................................. 376/283 |
| 94190 | 4/1988 | Japan ................................. 376/299 |
| 223593 | 9/1988 | Japan ................................. 376/283 |
| 302168 | 8/1968 | Sweden . |
| 877383 | 9/1961 | United Kingdom ................. 376/293 |

OTHER PUBLICATIONS

"Small LMR Cuts Costs and Boosts Safety", NEI, 11/87.
"Enhanced Safety Planned for RBMK and VVER", Nuclear News, 5/88.
S. N. Tower et al., Passive and Simplified Features for the Advanced Westinghouse 600 MWe PWR, 1987, pp. 1-10, Westinghouse Electric Corp., Pittsburgh, PA.

Primary Examiner—Daniel D. Wasil
Attorney, Agent, or Firm—E. F. Possessky

[57] ABSTRACT

A containment cooling system utilizes a naturally induced air flow and a gravity flow of water over the containment shell which encloses a reactor core to cool reactor core decay heat in two stages. When core decay heat is greatest, the water and air flow combine to provide adequate evaporative cooling as heat from within the containment is transferred to the water flowing over the same. The water is heated by heat transfer and then evaporated and removed by the air flow. After an initial period of about three to four days when core decay heat is greatest, air flow alone is sufficient to cool the containment.

15 Claims, 3 Drawing Sheets

PASSIVE CONTAINMENT COOLING SYSTEM

BACKGROUND OF THE INVENTION

1. Field of the Invention

The present invention relates generally to nuclear reactors and, more particularly, to a cooling system which provides an essentially passive means of cooling the containment of a nuclear reactor following postulated design basis events. This cooling system, in conjunction with other plant features can also function as a passive ultimate heat sink by removing all core decay heat rapidly

2. Description of the Related Art

The removal of heat from the containment of a reactor following postulated accidents is a safety related function that is typically performed by two or more separate, redundant "trains" of mechanical components and cooling systems. In a water cooled reactor, each of these trains typically includes one or more fan coolers and a series of cooling systems, such as component cooling water, service water and an ultimate heat sink, all supported by AC power generated by diesel generators, electrical power cabling and switch gear, control circuitry, HVAC etc. Since all of these systems perform a safety related function, they must be seismically and environmentally qualified, and housed in seismic designed structures.

The aforementioned structures and approach to nuclear plant safety has resulted in plant designs which are highly complex and expensive, since significant construction and operational effort is associated with seismic design, qualification, testing, and maintenance of these buildings and components.

Passive systems have been devised in order to greatly reduce the number of safety grade components and eliminate the need for safety grade support system functions, including AC power, heating and air conditioning, large cooling water systems for component cooling and ultimate heat removal. These passive systems eliminate the need for operator actions, increase safety function reliability, and reduce risk to the public. Plant availability and reliability are improved, while complexity, maintenance, cost, and construction time are reduced.

A passive safety system is described in U.S. Pat. No. 4,753,771 to Conway et al. (one of the co-inventors herein) A system is described in which the amount of redundant safety grade support systems and their associated structures are reduced by maximizing the use of natural phenomenon, such as gravity, compressed gas, and natural circulation, to accomplish all safety functions.

The containment cooling system presented in the aforementioned patent is based on natural circulation air cooling of the outside of the steel containment. This concept, in order to be applicable to commercial sized reactor plants, would require a larger than typical containment surface area and/or higher than typical containment design pressure/temperature.

Generally, prior attempts to simplify the containment heat removal function has had several draw backs which have deterred their application. Specifically, passive containment cooling was not combined with other passive safety features so that significant reductions in safety related building and support systems could be made on a total plant basis. Thus, structures and/or components required for containment cooling would only have been viewed as cost additions. Since the frequency of events which require safety related containment cooling are very low, there would be no recognized favorable cost/benefit ratio.

Also, the desire to maximize economies of scale in nuclear plant applications has resulted in a large portion of plants with a rating of 2,700 megawatts thermal or greater. These large plants typically require containment shells having 130 to 150 foot diameters. In the past, the use of a cylindrical steel containment for this size range was not considered practical, and spherical steel containments were not in general use. Therefore, concrete containments were the typical design choice. These concrete containments cannot be externally surface cooled.

Surface cooling of a steel containment shell requires that the shield building surrounding the shell be open to the environment to provide an air inlet and outlet or to vent steam. This is contrary to current practice, where plants which have a steel containment utilize the shield building to create a containment annulus which is filtered and therefore acts as a second barrier to radiation release.

The use of water only on the outside of the containment shell to remove heat and limit containment pressure has practical limitations. First, if the containment shell outside surface is to be kept below 212° F. (cooling water does not boil) a very large amount of cooling water is required. Providing this water using only gravity flow from an elevated tank is likely to be limited by practical storage capacity. Therefore, long term cooling would require additional qualified water sources, pumps, and associated structures such as piping and support systems. Thus, such a system would not be entirely passive. If the cooling water is to heat up significantly and boil, the outer shell surface temperature must be higher than 212° F. Since the saturation temperature of steam/air at 40 psig (typical steel containment maximum transient pressure) is only 250 F., a higher containment design pressure would most likely be required to provide sufficient change in temperature for heat transfer.

The use of air only on the outside of the containment shell to remove heat and limit containment pressure also has practical limitations. For example, cooling a containment with only air would require a significant increase in the containment surface area over that provided in current reactor containment designs since the heat transfer rates achievable are relatively small.

The use of passive heat sinks, such as water or other materials, in continuous contact with the containment shell is likely to have a large impact on the containment structural design, and will create concerns about corrosion.

SUMMARY OF THE INVENTION

An object of the present invention is to provide a containment cooling system which, once actuated, does not require active components (pumps, fans, chillers), electrical power, or operator action(s) in order to perform its cooling functions.

Another object of the present invention is to provide a cooling system which in conjunction with other "passive" safety systems is the safety grade ultimate heat sink for the removal of sensible heat and core decay heat from a nuclear plant following any postulated event.

Another object of the present invention is to provide a cooling system which in conjunction with other passive safety systems replenishes the source of water used to provide cooling to the reactor core such that cooling can be maintained for an indefinite period of time.

Another object of the present invention is to provide a containment cooling system that provides sufficient heat removal capability to both limit containment pressure in the short term and to reduce containment pressure (within 24 hours and beyond) in accordance with U.S. Nuclear Regulatory Commission and other national regulatory agency requirements.

Another object of the invention is to passively reduce the rate at which water is added to the containment shell surface to approximately coincide with the rate of core decay heat production.

These objects and others to become apparent are accomplished by a passive containment cooling system according to the present invention which includes a metal containment shell encasing a reactor core and having an inner and outer surface, a source of water disposed in an elevated position above the containment shell, a shield building surrounding the containment shell and having a top and inner and outer surfaces, an air inlet formed around the side radially just below the top of the shield building, a chimney formed centrally in, and extending upwardly from the top chimney of the of the shield building, an air baffle extending from the chimney at the top of the shield building downwardly over a substantial portion of the containment shell and having inner and outer surfaces and a shape substantially conforming to the shape of the containment shell and further having an open lower end, the inner surface of the shield building and the outer surface of the air baffle forming a first annular space extending from the air inlet to the open end of the air baffle, and the inner surface of air baffle and the other surface of the containment shell forming a second annular space extending from the open end of the air baffle to the chimney, the first and second annular spaces defining a cooling air flow path over the outer surface of the containment, and means associated with the source of water for releasing water on the top of the containment shell at a controlled rate. Preferably, the surface of the containment shell is provided with a layer of wettable material capable of promoting the spread of the water released on the containment. This material is a heat conductive, wettable paint. The second annular space is significantly smaller (approximately 15 inches wide for a substantial length of the containment shell) than the first annular space and thus causes air to flow over the outer surface of the containment shell at a relatively high velocity.

The water supply is preferably released on the top of the containment shell at a controlled rate by a fluid release system which includes a storage tank for holding the source of water and multiple water tank outlet pipes which extend into the tank and are each terminated at specific heights above the bottom of the storage tank. Two redundant water discharge lines each include a fail open air operated isolation valve which is actuated by battery power.

These, together with other objects and advantages, which subsequently will be apparent, reside in the details of construction and operation of the invention as more fully hereinafter described and claimed, reference being made to the accompanying drawings forming a part hereof wherein like numerals refer to like parts throughout.

DETAILED DESCRIPTION OF THE PREFERRED EMBODIMENTS

The passive containment cooling system of the present invention transmits heat directly from the reactor containment shell to the environment such that the containment design pressure and temperature are not exceeded following any postulated design basis event. The system is required to perform its containment heat removal function only when the normal means of containment heat removal, i.e., the containment fan coolers, are not available for an extended period of time. Also, the system is designed to operate following a postulated design basis event which results in a large energy release into the containment.

Figure 1:
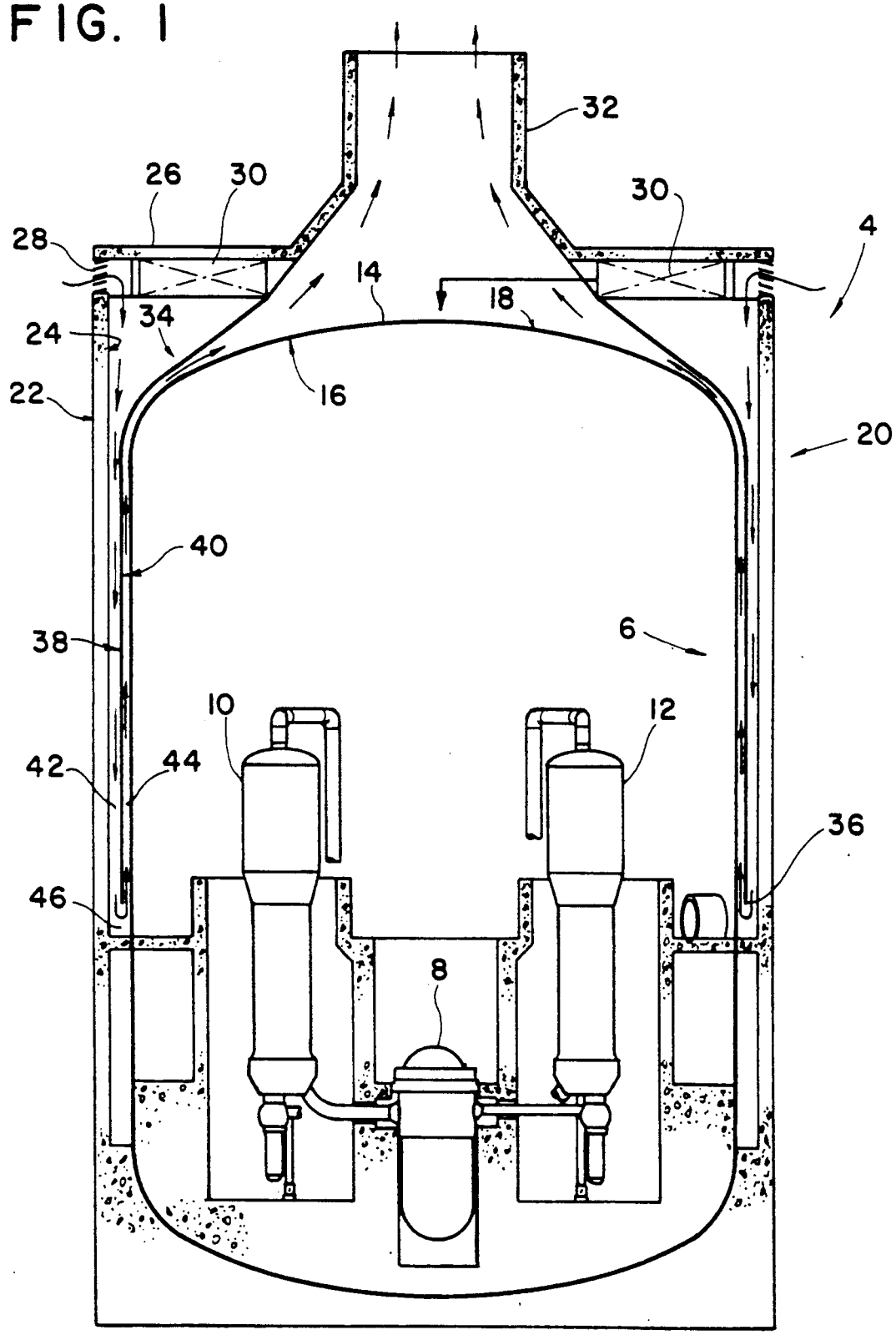
FIG. 1 is a side elevational view partly in section, of the passive containment cooling system according to the present invention.

Referring to FIG. 1, a passive containment cooling system 4 includes an metal containment shell 6 which encases a reactor vessel 8 and steam generators 10 and 12. The containment shell has a top 14, an inner surface 16 and an outer surface 18. For a typical plant capable of producing about 1800 megawatts thermal and using a pressurized water reactor and employing a cylindrical containment. The containment shell 6 has about 45 psig design pressure. The shell is made of steel about 1.75 inches in thickness. The diameter of the containment shell 6 is about 120 feet.

A concrete shield building 20 surrounds the containment shell 6 with about a 4.5 foot annulus between the outer diameter of the containment shell 6 and the inner diameter of the shield building 20.

The shield building 20 has an outer surface 22, an inner surface 24 and a top 26. An air inlet 28 is formed at the top 26 radially around the outside of the shield building 20. The air inlet 28 may include a plurality of equal distantly spaced inlet openings which may be provided with louvers to prevent rain entry. Other means of directing air flow may be used.

A source of water 30 is supported by the shield building 20 in an upper portion thereof and preferably contains about 350,000 gallons of water. The water supply 30 in the preferred embodiment is disposed in a radial tank, which is made of a series of sub-tanks in fluid communication with each other.

The top 26 of the shield building 20 has a centrally formed chimney 32 extending upwardly therefrom which provides an exhaust for heated air and water vapor. The chimney functions to increase the height of heat air thereby creates a higher natural circulation air mass flow rate. The chimney also prevents heated air from being drawn into the air inlets. In one embodiment, the chimney is about fifty feet above the top of the shield building, or about sixty-five feet above the top of the containment shell 6.

An air baffle 34 is disposed between the shield building 20 and the containment shell 6 and extends from the lower end of the chimney 32 downwardly over a substantial length of the containment shell. The air baffle 34 may be made of sheet steel shaped to substantially conform to the shape of the containment shell 6 and has an open lower end 36, an outer surface 38, and an inner surface 40. The inner surface 24 of the shield building and the outer surface 38 of the air baffle 34 form a first annular space 42 extending from the air inlet 28 to the open end 36 of the air baffle 34 (although due to the elliptical shape of the upper portion of the containment shell the annular space becomes enlarged).

The inner surface 40 of the air baffle 34 and the outer surface 18 of the containment shell 6 form a second annular space 44 which extends from the open end 36 of the air baffle 34 to the chimney 32. The first and second annular spaces 42 and 44 define a cooling air flow path, indicated by directional arrows in FIG. 1. Ambient air is drawn into the air inlet 28 and flows downwardly through the first annular space 42 and then upwardly through the second annular space 44 passing over the outer surface 18 of the containment shell 6 before exhausting through the chimney 32. Air flow occurs by natural circulation induced by the buoyancy of heated air. If wind is present additional air flow is induced by the up-draft created by the chimney and wind pressure at the air inlet.

Containment cooling by natural draft, wherein ambient air passes over the containment shell surface 18, would be insufficient by itself for an appreciable time immediately following a limiting design basis event. Therefore, the system of the present invention requires the release of water from the water supply 30 onto the outer surface 18 of the containment shell 6. Preferably, the water is introduced onto the containment outer surface at the top center of the containment shell upper dome and flows outwardly from the center of the dome covering or wetting the containment outer surface 18 with a flowing film of water. The water initially cools the containment surface by direct conductive heat transfer. As the water heats up, it begins to evaporate into the flowing air stream in contact with the water. This creates an evaporative cooling effect which cools the containment at temperatures well below the normal water boiling point at the expected moderate heat fluxes. This is due to the fact that the air diffuses to the evaporating surface and lowers the partial pressure of water vapor coming off and thereby lowers the water saturation temperature.

The release of water is intended to provide a short term (about three days) cooling capability. Thus, three days after the initiating design basis event it would be expected that the water supply would be replenished. However, even if no additional water is provided, after three days, air cooling alone will be sufficient to maintain the containment below its design pressure.

Another aspect of the present invention is the use of a specific type of inorganic paint which covers the inner surface 16 and outer surface 18 of the containment shell 6. The paint is a specific type which is easily wetted and helps insure maximum water coverage on the containment outer surface while minimizing the need for elaborate water distribution weirs. Preferably, the paint is a zinc-based paint which is applied to the outer surface of the metal containment shell 6. The zinc-based paint is easily wetted and causes water to spread rather than forming rivulets. This is because a paint layer of the zinc-based paint, dried to a thickness of between 6-10 mils, has a rough, somewhat porous finish.

This porous, wettable finish also minimizes the tendency for thin water films to form dry patches, as has been observed at the film thicknesses and temperatures achieved in this application.

In addition, the zinc-based paint has a high heat conductivity in contrast to other paints. Inorganic metal based paints tend to have heat conductivity ten to twenty times greater than that of the standard, organic paints which are normally used to paint containment shells. This maximizes the capability to conduct heat through the containment shell to the outer surface thereof, maximizing the effectiveness of the evaporative cooling concept of the present invention and results in lower containment pressure. Standard organic paints would inhibit heat transfer by conduction through the containment shell. The zinc also protects the steel containment shell from corrosion by galvanic action. After drying, the paint layer contains about 85% zinc. Although zinc-based paints are known in the paint industry, these paints are not sold for the purpose described above. One such zinc-based paint is commercially available and sold under the trademark CARBOZINC 11, which is made by Carboline of St. Louis, Mo.

The evaporative cooling effect is enhanced by creating a high Reynolds number air flow over the outer surface of the containment shell. This is accomplished by providing a small width for the second annular space 44. Preferably, the width is between eight and fifteen inches. Although reducing the width goes contrary to conventional wisdom, the present inventors discovers that high air velocity is more important to evaporative cooling than high air mass flow.

Another feature of the present invention is that an air reservoir is provided at the open lower end 36 of the air baffle 34. This configuration decreases the pressure drop that would occur when the air changes direction from the inlet to the outlet side of the air baffle 34.

Figure 2:
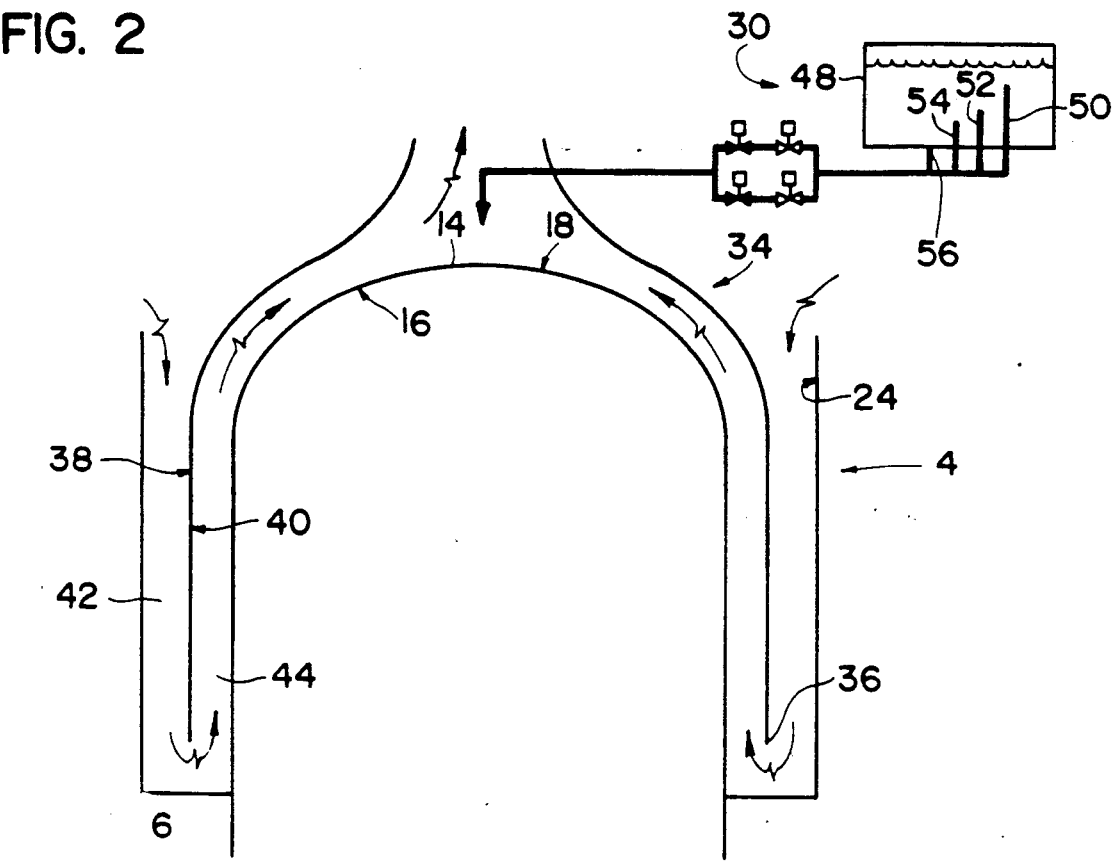
FIG. 2 is a schematic view of the fluid release system of FIG. 1.

FIG. 2 illustrates schematically the air flow as it circulates downwardly through the first annular space 42 and then upwardly through the second annular space 44 over the outer surface 18 of the containment shell 6. The water supply 30 is shown in an elevated position over the top 14 of the containment shell 6 and is illustrated schematically to include a water tank 48 into which four water outlet pipes 50, 52, 54 and 56 are disposed. Each of the outlet pipes terminates at a specified height above the bottom of the water storage tank. Thus, when the system is activated, the rate of flow of water from the tank 48 is passively controlled by the descending arrangement of water outlet pipes such that as the water level falls, the higher pipes become successively inactive as outlets. As is apparent, the greatest rate of release of water occurs in the beginning when the tank is full and, as the water level falls, the rate of water flow declines in stages corresponding both to the outlet pipe uncover and reduced water head.

Figure 3:
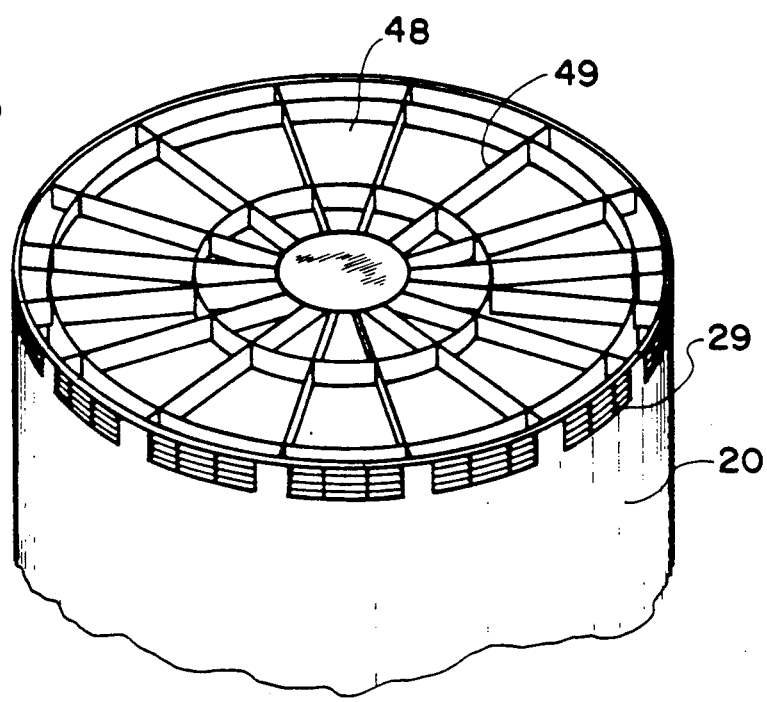
FIG. 3 is a perspective view of a preferred arrangement of the water tank used in the system of FIGS. 1 and 2.

As shown in FIG. 3, the water tank 48 illustrated schematically in FIG. 2 is preferably composed of a plurality of sub-tanks which are disposed radially within the radial support beams 49 at the top of the shield building 20 in order to minimize the overall height of the shield building 20. The radial support beams 49 have holes (not shown) in lower portions thereof which permit water to flow unrestricted between sub-tanks. Holes (not shown) are also provided in the upper portion of the support beams above the water level to allow air to flow between the sub-tanks to facilitate draining. FIG. 3 is a perspective illustration of the shield building 20 with the top removed. It is also apparent from FIG. 3 that the air inlet is a plurality of horizontal-facing air inlet openings 29 disposed radially around the shield building 20 in the cylindrical side wall thereof at approximately the same level as the water tank 48.

Figure 4:
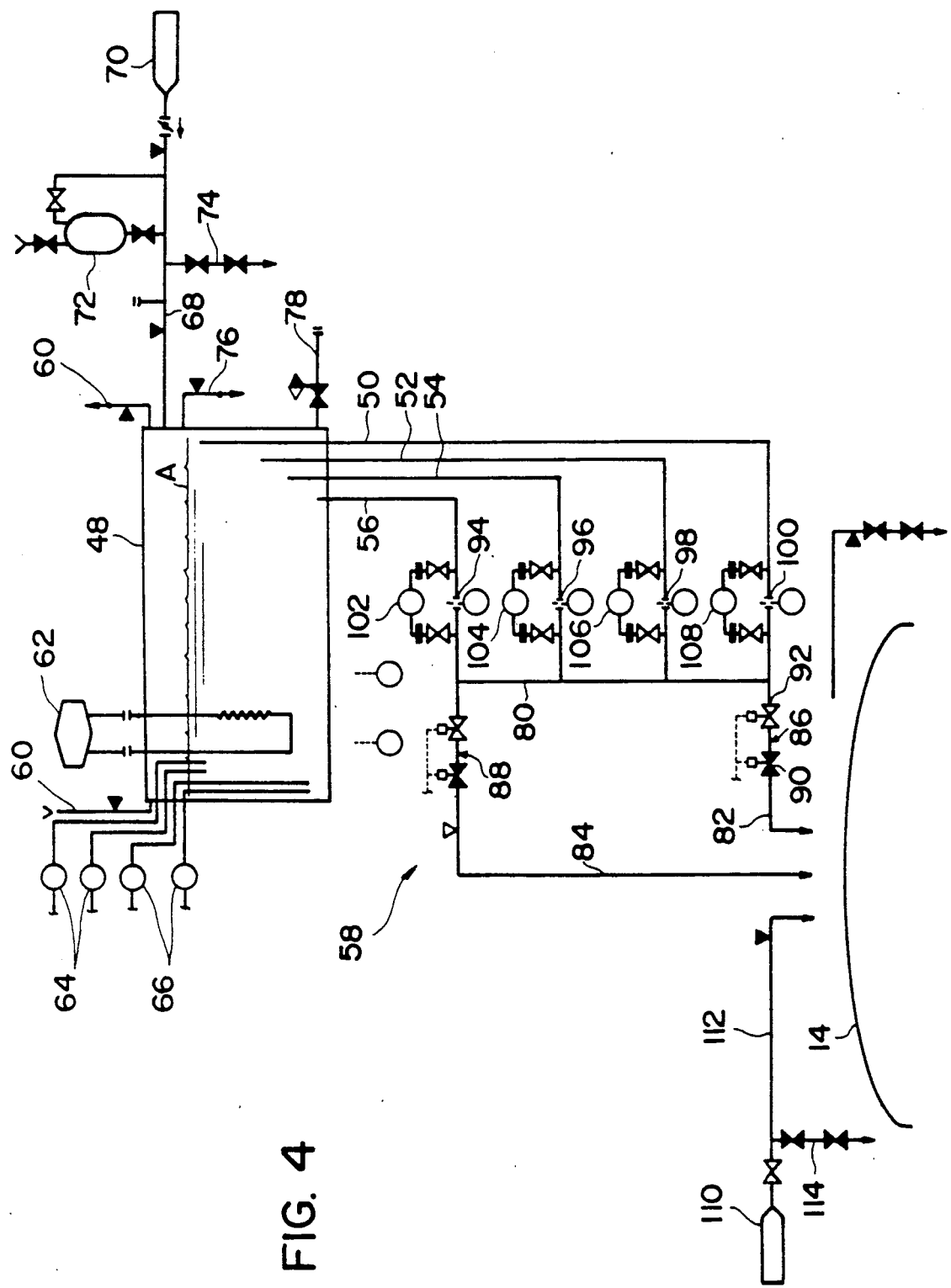
FIG. 4 is a schematic view of a fluid release system for releasing water on the top of the containment shell according to the passive containment cooling system of FIGS. 1 and 2.

FIG. 4 is a schematic illustration of the fluid release system 58 which forms a part of the passive containment cooling system 4 illustrated in FIGS. 1 and 2. The water tank 48 is provided with water outlet pipes 50, 52, 54 and 56. (Although the embodiment described herein has four outlet pipes, three may also be used. If three are used, the top pipe 56 and corresponding lines and valves could be eliminated. Other numbers of pipes could be used to achieve a desired rate of release.) Line A represents the full water level of the water tank 48. Redundant vents 60 are provided in upper portions of the tank 48 at opposite sides thereof to facilitate or assure draining. A heater 62 is provided to keep the water in the tank from freezing and can be activated automatically in response to redundant water temperature sensors 64 upon sensing a predetermined minimum temperature. Operation of the heater is not required following a design basis even when this cooling system functions. The heat capacity of the heated water combined with the insulating properties of the construction material assures that the water will not freeze during the 3 day drain time. Two tank level sensors 66 are also provided in the tank 48 to assure that the normal level is maintained and to allow the operators to monitor the decreasing level when in use. The circular symbols for the sensors 64 and 66 represent monitoring instruments in the control room of a power station so that the operator can be apprised of the sensed conditions.

The tank is filled by a filling line 68 which is connected to a water source 70. A small tank 72 allows the addition of algecides, etc. to the water supply as needed. The line 76 is an overflow line, and a drain connection 76 is provided for draining the tank 48.

The tank outlet pipes 50, 52, 54 and 56 each terminate at a specified height above the bottom of the water tank. Each pipe inlet is provided with an extended, welded-in metal cross (not shown) to prevent blockage by debris and to act as a vortex breaker. Typically, the water height in the tank is about six feet, and the bottom of the tank is about three feet above the top 14 of the containment shell. Thus, a potential for a nine foot elevational head is created, providing nine feet of pressure drop (which amounts to about four psi). Each of the outlet pipes feeds into a manifold 80, which in turn allows water from all four of the outlet pipes to flow out through either of two water discharge lines 82 and 84. Each discharge line 82 and 84 is provided with a fail open air operated isolation valve 86 and 88, respectively, which opens in response to the attainment of a predetermined level of pressure in the containment shell sensed by pressure sensors within the containment (not shown). The solenoid valve which vents the air operator is preferably powered by a battery associated therewith. Each line 82 and 84 also includes a normally open valve 92 which is actuated by a d.c. motor powered by batteries associated therewith. This open valve also receives a signal to open upon detection of a sufficient level of pressure in the containment shell. These motor valves are normally only closed in order to perform an operability test of the air actuated valves.

The outlet pipes 50, 52, 54 and 56 also include flow orifices 94, 96, 98 and 100 which are used to establish a desired flow rate out of each respective pipe. Thus, the flow rate, through each outlet pipe as measured by flow meters 102, 104, 106 and 108 can be tested periodically and flow versus time can be monitored.

Once the flow rate of each outlet type is established, the collective flow rate of all of the outlet pipes will vary as the water level falls. This collective flow rate is designed to both decrease coincidentally with a decline of the decrease in decay heat after a design basis event, and to provide a desired containment pressure versus time. For example, after the initial blow down of the reactor system following a postulated pipe break, heat is added to the containment at a rate corresponding to core decay heat. As decay heat decreases with time, the amount of water required to be evaporated from the containment (while maintaining a constant containment pressure) will decrease proportionately. Additional water, if evaporated, would result in a decrease in containment pressure. Analyses have shown that the preferred application described herein can reduce containment pressure to about 10 p.s.i.g. at 24 hours after the most limiting design basis event and can maintain this low containment pressure until the stored water is used at the end of three days. The above-described fluid release system provides the desired flow versus time. Maximum flow occurs initially when all of the outlet pipes drain and tank level is high. As the tank drains, flow decreases in proportion to the (elevation head of water)$^{\frac{1}{2}}$. As the tank continues to drain, the higher level outlet pipes successively uncover and become inactive, thus causing additional flow reduction due to the decreased outlet flow area available (higher fluid release system flow resistance).

The fluid release system 58 further includes an auxiliary water supply for adding water directly to the containment dome. The auxiliary water supply 110 includes a feed line 112 and a drain 114.

In the event of a rapid rise in temperature within the containment which leads to a concomitant rise in pressure which is detected by the pressure sensor, the passive fluid release system 58 is activated simply by opening the isolation valve assemblies 86 and 88. As the water flows through the outlet pipe 50, 52, 54 and 56, the fluid discharge can occur through either or both of water discharge lines 82 and 84. Since the lines are redundant, and since the manifold 80 and water discharge lines 82 and 84 are specifically designed to be of larger diameter than the outlet pipes 50, 52, 54 and 56, the flow rate, as established by the flow orifices, will be the same whether the flow occurs through one or both of the water discharge lines 82 or 84. Thus, the system can be operated such that both isolation valve assemblies 86 and 88 are triggered to open upon receipt of a pressure signal, and if one or both open, the flow rate will be the same in either case. It is highly unlikely that both would fail to open, but in the unlikely event that one should fail to open, the other would be sufficient to maintain the predetermined flow rate.

It should be borne in mind that the piping illustrated schematically in FIG. 4 will in actuality be constructed to slope continuously downwardly from the outlet side of the normally closed valve 90.

Numerous alternations and modifications of the structure herein disclosed will suggest themselves to those skilled in the art. It is to be understood, however, that the present disclosure relates to the preferred embodiments of the invention which are for purposes of illustration only and are not to be construed as a limitation of the invention. All such modifications which do not depart from the spirit of the invention are intended to be included within the scope of the appended claims.

What is claimed is:

1. A passive containment cooling system comprising:
    a metal containment shell encasing a reactor core and having a top and inner and outer surfaces;
    a water supply disposed in an elevated position above the containment shell;
    a concrete shield building surrounding the containment shell and having a top and inner and outer surfaces;
    an air inlet formed radially at the top of the shield building;
    a chimney formed centrally in and extending upwardly from the top of the shield building;
    an air baffle extending from the top of the shield building over a substantial length of the containment shell and having inner and outer surfaces, a shape substantially conforming to the shape of the containment shell and an open lower end;
    the inner surface of the shield building and the outer surface of the air baffle forming a first annular space extending from the air inlet to the open end of the air baffle;
    the inner surface of the air baffle and the outer surface of the containment shell forming a second annular space extending from the open end of the air baffle to the chimney;
    the first and second annular spaces defining a cooling air flow path over the outer surface of the containment; and
    a fluid release system for releasing water on the top of the containment shell in stages with a highest rate occurring in a first, initial stage and a lowest rate occurring in a last stage.

2. A passive containment cooling system as recited in claim 1, further comprising means for accelerating air flow over the outer surface of the contaminant shell.

3. A passive containment cooling system as recited in claim 2, wherein said second annular space is approximately 8 to 15 inches wide for a substantial length of the containment shell, the width of the second annular space providing the accelerating means.

4. A passive containment cooling system as recited in claim 1, wherein the fluid release system includes a water tank for holding the water supply, a plurality of water outlet pipes, each having one end extending into the water tank and terminating at different levels to vary the rate of release, a manifold joining the other, opposite ends of the water outlet pipes, a plurality of discharge pipes, each connected to the manifold and extending over the containment shell, and each having a valve assembly actuated in response to a rise in containment pressure.

5. A passive containment cooling system as recited in claim 4, wherein the fluid release systems includes four water outlet pipes, each having one end extending into the water tank and terminating at successively higher water levels, and two discharge pipes, each connected to the manifold and extending over the containment shell, and each valve assembly includes a normally closed valve and a normally open valve, each being actuated by a d.c. motor having a battery power supply.

6. A passive containment cooling system as recited in claim 4, further comprising means for regulating the flow rate of water through each outlet pipe, and means for measuring the flow rate of water through each outlet pipe.

7. A passive containment cooling system as recited in claim 6, wherein the regulating means includes a flow orifice disposed in each outlet pipe upstream of the manifold, and a flow meter associated with each flow orifice.

8. A passive containment cooling system as recited in claim 4, further comprising a water heater for heating water in the water tank, and a water temperature sensor for sensing the temperature of the water in the tank, the heater being actuated when the sensed temperature falls below a predetermined value.

9. A passive containment cooling system as recited in claim 1, further comprising an outer layer of easily wettable, water diffusing, heat conductive inorganic paint covering the outer surface of the containment shell.

10. A passive containment cooling system as recited in claim 9, further comprising an inner layer of water diffusing, heat conductive inorganic paint covering the inner surface of the containment shell.

11. A passive containment cooling system as recited in claim 9, wherein the inorganic paint is a zinc-based paint.

12. A passive containment cooling system as recited in claim 10, wherein the inorganic paint is a zinc-based paint.

13. A passive containment cooling system as recited in claim 1, wherein the metal containment shell is elliptically shaped.

14. A passive containment cooling system as recited in claim 1, wherein the air inlet is formed circumferentially so as to open horizontally.

15. A passive containment cooling system comprising:
    a metal containment shell encasing a reactor core and having a top and inner and outer surfaces;
    a water supply disposed in an elevated position above the containment shell;
    a concrete shield building surrounding the containment shell and having a top and inner and outer surfaces;
    an air inlet formed radially at the top of the shield building;
    a chimney formed centrally in and extending upwardly from the top of the shield building;
    an air baffle extending from the top of the shield building over a substantial length of the containment shell and having inner and outer surfaces, a shape substantially conforming to the shape of the containment shell and an open lower end;
    the inner surface of the shield building and the outer surface of the air baffle forming a first annular space extending from the air inlet to the open end of the air baffle;
    the inner surface of the air baffle and the outer surface of the containment shell forming a second annular space extending from the open end of the air baffle to the chimney;
    the first and second annular spaces defining a cooling air flow path over the outer surface of the containment;
    a fluid release system for releasing water on the top of the containment shell at a variable rate; and
    an outer layer of easily wettable, water diffusing, heat conductive inorganic paint covering the outer surface of the containment shell.

* * * * *